June 5, 1962   J. F. MASTERSON ET AL   3,037,860
FRICTION ARTICLES AND PROCESSES FOR
MANUFACTURING AND MOUNTING SAME
Filed April 24, 1957   6 Sheets-Sheet 1

INVENTORS
CHARLES S. FERGUSON
JAMES F. MASTERSON
BY John A. Young
ATTORNEY

June 5, 1962 J. F. MASTERSON ET AL 3,037,860
FRICTION ARTICLES AND PROCESSES FOR
MANUFACTURING AND MOUNTING SAME
Filed April 24, 1957 6 Sheets-Sheet 2

INVENTORS
CHARLES S. FERGUSON
JAMES F. MASTERSON
BY John A. Young
ATTORNEY

INVENTORS.
CHARLES S. FERGUSON
JAMES F. MASTERSON
BY John A. Young
ATTORNEY

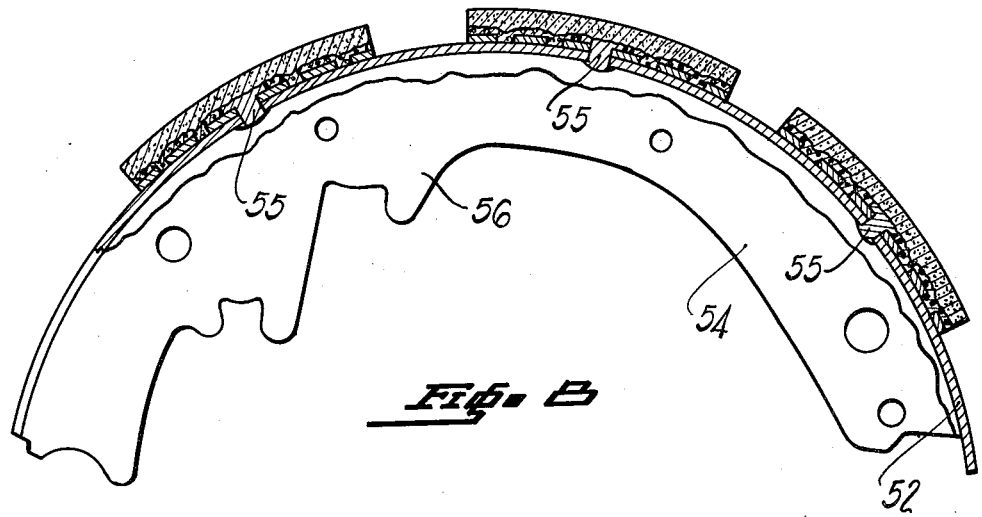
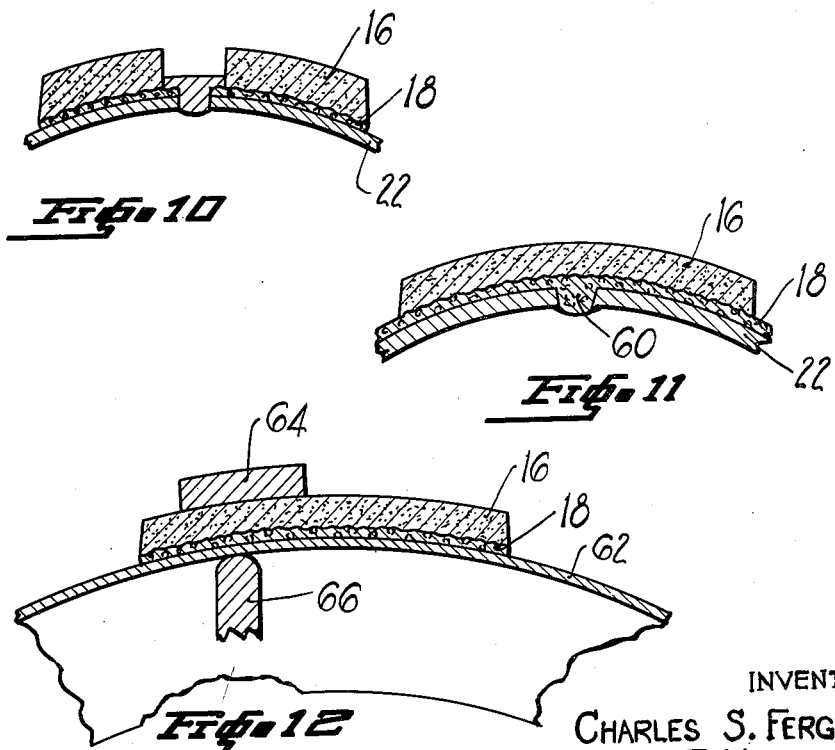

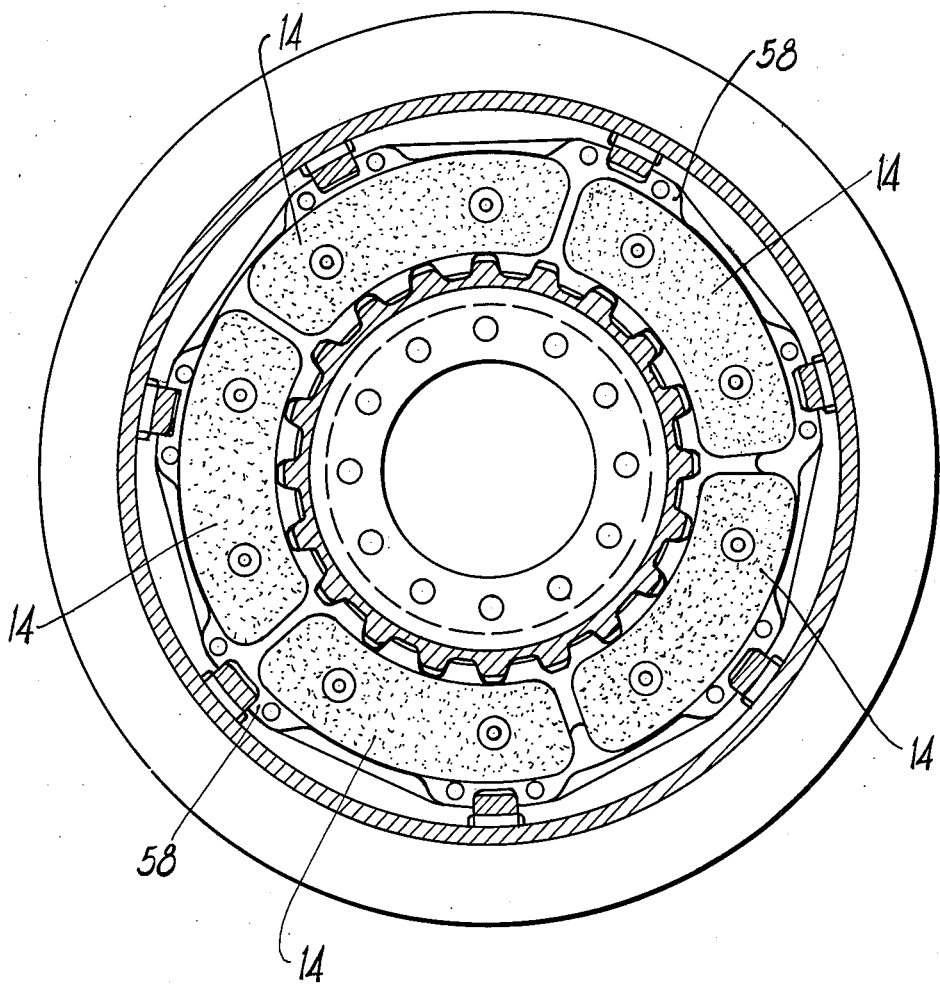

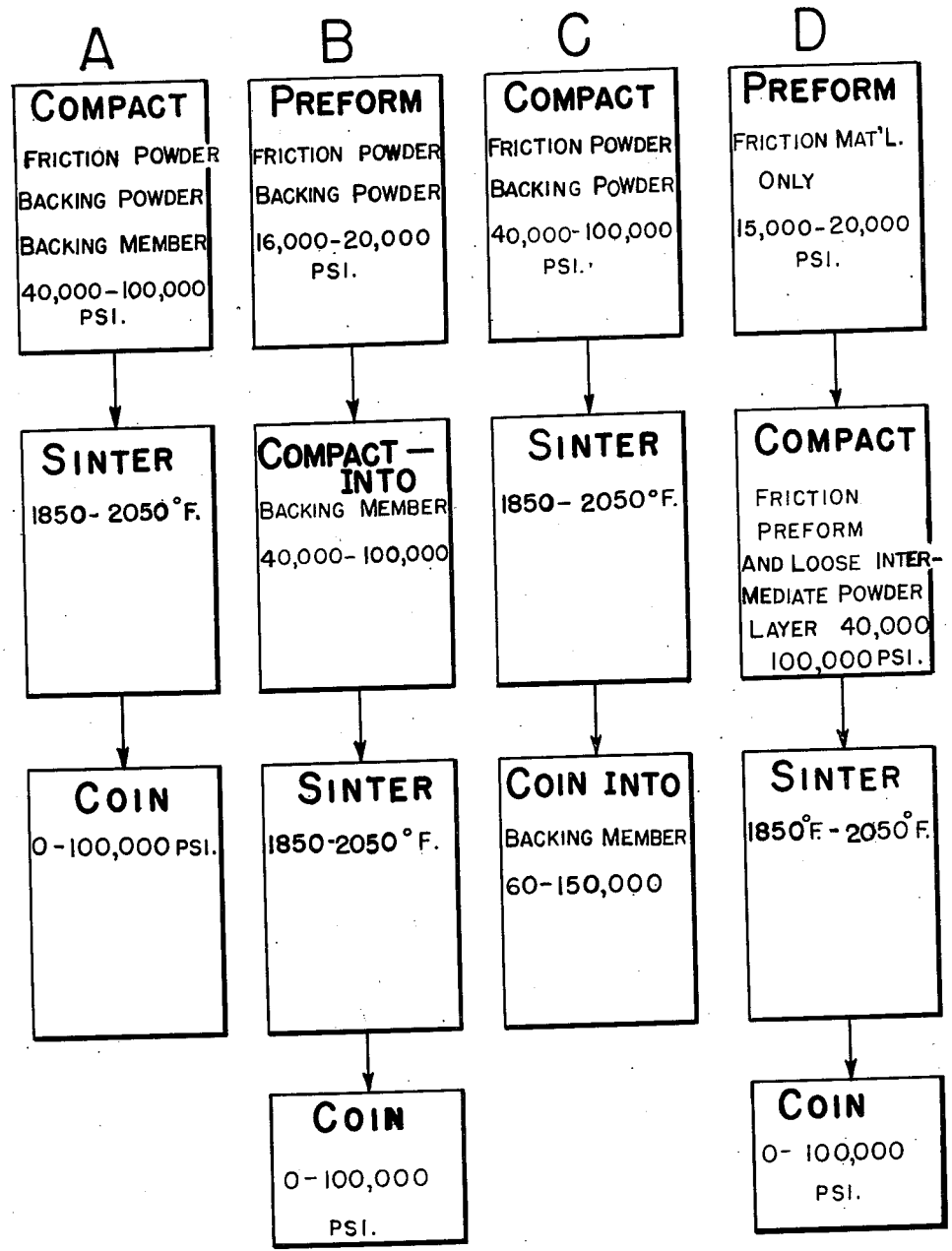

United States Patent Office 3,037,860
Patented June 5, 1962

3,037,860
FRICTION ARTICLES AND PROCESSES FOR MANUFACTURING AND MOUNTING SAME
James F. Masterson, South Bend, Ind., and Charles S. Ferguson, Troy, N.Y., assignors to The Bendix Corporation, a corporation of Delaware
Filed Apr. 24, 1957, Ser. No. 654,866
3 Claims. (Cl. 75—208)

This invention relates to friction articles and processes for manufacturing and mounting the friction articles onto support members. Both the articles and the support members may be constructed in various shapes, depending upon the intended usage.

It will become clear as the description progresses, that both the articles and the mounting processes are useful in a wide variety of brakes, including the drum type brake employing an arcuate shoe; the disc type brake, in which there are relatively rotatable and nonrotatable annular members; and, the so-called "caliper" brake in which the friction segments engage with a portion only of the rotor. The friction articles and manufacturing processes are also useful in clutch devices (both wet and dry). Numerous other applications of the invention will occur to those skilled in the art where it is necessary to provide a friction material lamination on a mounting or supporting member.

The friction material of the present invention consists of a sintered ceramic-metallic-graphite mixture in which the metal powder is sintered to serve as a binder or matrix for the friction material. This combination of ingredients has been found to have properties which make it superior in many respects to the previously used organic friction materials. The ceramic-metallis compounds, as a class, are especially better than the organic compounds in such qualities as heat resistance, fade resistance, stability, greater effectiveness, and longer wear rate.

The friction materials which we have most generally used in conjunction with the present invention are described in considerable detail in U.S. Patent No. 2,784,105, issued March 5, 1957.

There is generally combined with the ceramic-metallic friction material, a reinforcing cup having a base with a surrounding laterally extending side which provides reinforcement for the friction material and mechanically locks the friction material within the cup. These features are shown in Patent No. 2,784,105 and are described at length in copending application No. 600,808.

The reinforcing cup has two distinct functions: (1) the friction material is given lateral support by the side of the cup to compensate for the friable tendency of the material, i.e. the wall of the cup reinforces the friction material against crumbling under tangential and normal loading; (2) the cup serves to mechanically lock the friction material by serving as a container. The container or cup is then in turn secured to the mounting member, since the friction material is not readily attachable directly thereto owing to its relatively weak character.

For some brake and clutch operations it is possible to formulate the lining composition with sufficient metallic binder so that it possesses a considerable degree of cohesiveness. In such instances the friction material will not require the external lateral support of the container wall and it becomes possible to eliminate the cup wall if there is provided a reliable means for attaching the friction material to the base of an intermediate member.

By means of the present invention we propose a method by which friction material can be bonded at its under surface to an intermediate metallic member, with a bond having sufficient strength to render unnecessary the container wall as a mechanical locking means for gripping the friction material.

There is some advantage in eliminating the wall of the container. For example, under some conditions the container wall tends to score and groove the opposing friction surface. With elimination of the container wall there may also be an improved smoothness of engagement between the friction material and the opposing surface.

The invention can, of course, also be used in conjunction with a container having supporting walls. It is essential to obtain a reliable fixation of the friction material to a mounting member, and, since the invention proposes to bond the undersurface of the friction material, this will supplement containment of the friction material by the cup or container. When the supporting walls of the container are worn and provide less locking action on the friction material, the friction material will still be held and maximum utility thus derived from the friction material.

It is an important part of the invention to provide a lamination of intermediate metal which originates as a loose powder layer and is located between the friction material (previously described) and the carrier member. This intermediate medium in its finished form is resistant to fracture or breakage in its attachment to the carrier member, and is adequately bonded to the friction material to prevent its breaking away under the action of shear stresses which arise during application.

In previous methods of securing the friction material segment to a backing by means of bonding, there was required an externally imposed pressure which forced the interface of the backing and lining segment tightly together during heat processing. It was necessary to maintain this pressure on the interface during the heat processing in order to develop a bond between segment and backing. This requirement for pressure during sintering necessitates the use of complicated furnaces and elaborate apparatus, but most undesirable is the fact that it retards high production methods and adds cost to the item.

The process we propose is particularly advantageous for bonding friction materials having high concentrations of ceramic and/or graphite. These types of friction materials were difficult to bond with previously known processes and quite often it was impossible to obtain an adequate bonding between friction material and adjacent surface. These difficulties are, for the most part, surmounted by the present invention. It has been possible by following our process to bond friction materials having concentrations of ceramic and graphite which heretofore precluded sinter or weld bonding of the friction material to adjoining metallic surfaces.

A further feature of the invention relates to securement of the intermediate layer to a carrier member. To achieve this we provide in some instances a perforated backing member so that metal from the intermediate layer fills the perforations and thus becomes dowelled or mortised with the backing member. This perforated backing member is in turn riveted, or otherwise suitably secured, to a carrier.

It is an object of the invention to provide a method whereby the intermediate layer may be directly secured to a carrier plate without a perforated disc or screen in one of the following manners: by riveting an integral portion thereof; by providing separate rivets or other suitable fastening means; or by welding, however design preference dictates.

Other objects and features of the invention will become apparent from a description of the following invention, which proceeds with reference to the accompanying drawings, wherein:

FIGURE 8 is a section view taken along the length of an arcuate brake shoe showing how the invention can be used with a shoe type brake;

FIGURE 9 is a side elevation view of an annular carrier plate having friction articles provided thereon which are constructed according to the present invention, said annular carrier plate being usable as a stator member of a disc brake assembly or usable as a clutch plate, whichever is desired;

FIGURES 10, 11 and 12 are sectional detail views of friction articles illustrating various attachment methods of the intermediate layer directly to the mounting member; and, FIGURE 13 shows various flow diagrams outlining different processing steps of manufacture.

Figure 1:
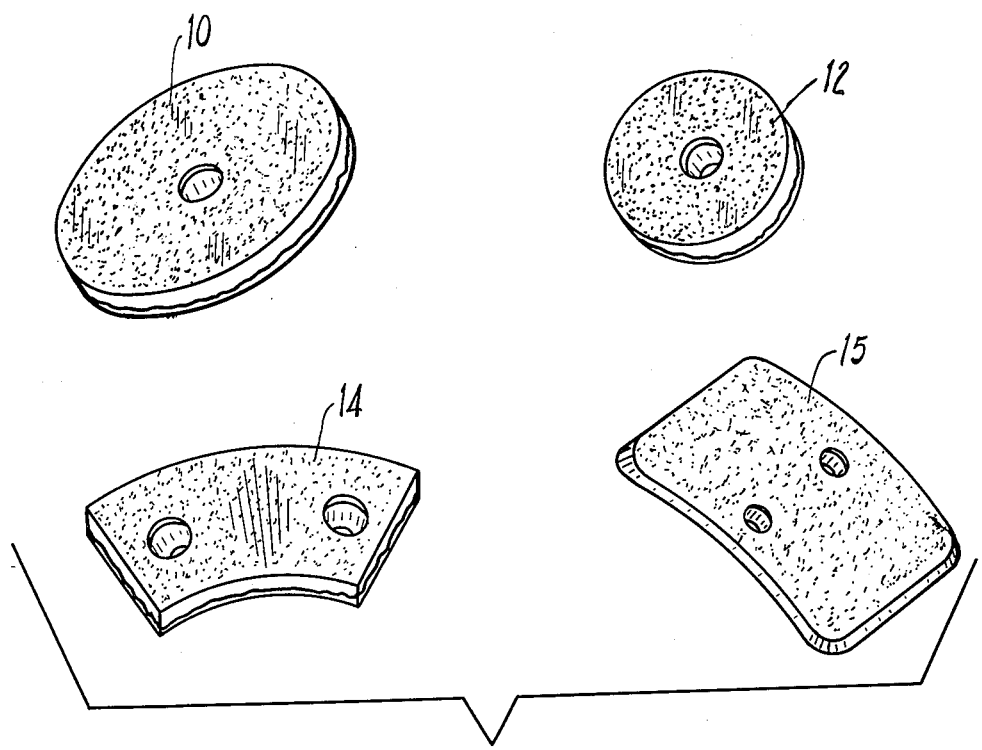
FIGURE 1 shows variously shaped friction segments in isometric views, these segments as shown are detached from their respective carrier plates.
Figure 2:
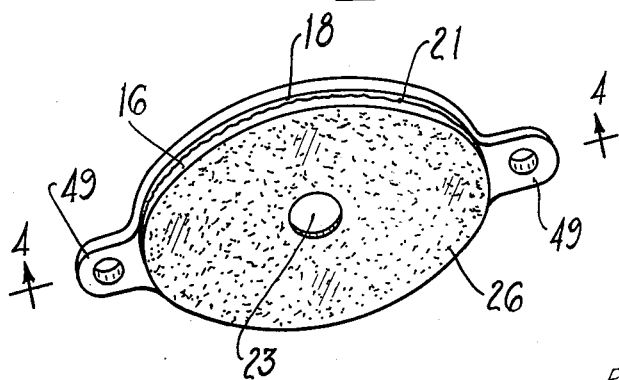
FIGURE 2 is an isometric view of a completed friction article usable with a "caliper" brake device.

As indicated in FIGURE 1, there is no practical limitation to the shape in which the friction segments can be constructed. They may be oval, circular, rectangular or sector shaped. These various configurations, in turn, may be either flat (as used in a "caliper" construction, disc brake and clutch construction) or they may be formed arcuately to conform to the rim of a shoe. Each of the friction segments, indicated as 10, 12, 14 and 15 in FIGURE 1, are constructed in accordance with a process which will next be described with particular reference to FIGURES 2 and 4.

Figure 4:
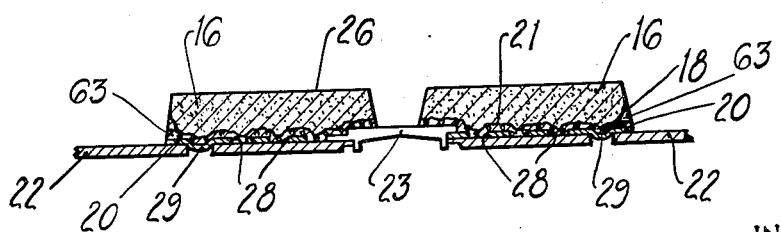
FIGURE 4 is an enlarged section view of the friction article shown in FIGURE 2.

In FIGURE 4 there is shown a friction material layer 16, a bonding medium layer 18, a perforated backing 20 and a carrier member 22.

The layer 18 originates as loose metal powder which is then covered with a layer 16 of loose powder ceramic-metallic friction material. Because of the concurrent powdered condition of the two layers 16 and 18, there is opportunity for mutual dispersal of one layer in the other at the interface 21 of the two layers. There is, in other words, a slight intermixture of the two layers 16 and 18 which has a surprisingly substantial effect on the quality of sinter-bonding between the two layers.

Referring to FIGURE 13, the various steps of the process will next be discussed:

In process "A" the powder layers 16 and 18 are laid over the perforated backing 20 and then compacted at about 40,000–100,000 p.s.i. In processes "A," "B" and "C," the two layers 16 and 18 are in powdered form at the time of compaction so they are simultaneously densified.

During compaction in processes "A" and "B" the perforations in the perforated backing member 20 are filled with metal powder from bonding medium layer 18 which is thereby mortised with the backing 20. The interface 21 of layers 16 and 18 is characterized by irregularities which appear as ripplings over the entire interfacing 21.

Following compaction, the friction article in process "A" is next heat-treated at 1200° F. to 2050° F. to sinter the metal matrix of layer 16 and the bonding medium layer 18.

At the same time that the metal particle layers 16 and 18 are coalesced, there occurs a sintering-bonding between layers 16 and 18 at the interface 21 in which the adjoining metal particles of the two layers become bonded together. It is highly significant to the invention that this sinter-bonding at the interface 21 is achievable without interposition of pressure at the surface 26 to ensure adequate contact between the two layers 16 and 18. The ability to sinter-bond the two layers without external pressure greatly simplifies the apparatus required and is conducive to greater manufacturing economy and high rate of production techniques. For example, the segments of compacted lining are simply conveyorized through a heating oven after compacting.

Following sintering, the friction article is next coined at pressures up to 100,000 p.s.i. The purpose of coining is to reduce porosity in the layers and by densifying the layers the desired hardness is achieved. The wear properties of the friction segment are improved by the coining step.

In process "B," the two layers 16 and 18 are formed first into what is called a "preform," i.e. a self-supporting briquette in which the metal particles are cohered together. The "preforming" is done at 16,000 to 20,000 p.s.i. Next the "preform" is compacted against the perforated backing member 20 at 40,000 to 100,000 p.s.i. Following this the article is heat-treated at 1200° F. to 2050° F. to sinter the metals and then coined as indicated in process "A."

Referring to process "C," the two layers 16 and 18 are briquetted at 40,000 to 100,000 p.s.i., sintered at 1200° F. to 2050° F. and then coined with or without the perforated backing medium at about 100,000 p.s.i. During coining, if a perforated backing is used, the metal of bonding medium layer 18 is extruded into the perforation of backing 20 and thus interlocked with the backing.

The indicated pressure ranges and temperature ranges are determined from the character of the materials, and specific temperatures and pressures are derived from applying ordinary, well-known considerations within the skill of the art. Specific examples are given hereafter in a processing chart which illustrates usable temperatures and pressures relating to specific compositions. From this list of illustrative examples, any person skilled in the art can determine the necessary temperatures and pressures for selected materials by applying well-known principles. Generally speaking, the preforming pressure is maintained as low as possible. We have avoided pressures in excess of about 40,000 p.s.i. and, although we have generally practiced the process in the range of 16,000–20,000 p.s.i., pressures in the 5,000–16,000 range are preferred where the constituency of the materials permits. Also, the indicated upper limit of sintering temperature is 2050° F. for the higher melting materials.

In proceess "D," the friction material is formed into a "preform" (a self-supporting briquette). This "preform" is compacted together with a fill of loose metal material at 40,000–100,000 p.s.i. The laminate is then sintered and coined as in the previously described process.

A fifth process may be used in which the friction material layer and adjacent bonding medium layer are compacted at about 15 tons/in.² Both layers are initially in powder form prior to coining. Thereafter the layers are sintered for about one and one-half hours during which time the material is at 2050° F. for about forty-five minutes. Following sintering the segment is coined at 50 tons/in.² and then welded directly to the backing (clutch plate, shoe rim, etc.). This process has provided satisfactory results using the formulae listed as compositions "K" and "L" in the table.

The resultant bond between the two layers 16 and 18 is remarkably strong and is also surprisingly tenacious. For example, shear loads as high as 500 p.s.i. are successfully withstood by the described bonding. The sinter-bond at interface 21 is sufficiently strong and extensive so that instead of failures occurring at the interface 21, the friction material layer 16 can be worn down completely to the layer 18, thus realizing the full utility of the friction material lining layer 16.

It is necessary to select the composition of intermediate powder layer 18 on the basis of its sinterability with the matrix metal of the friction material layer 16. Thus, where copper or copper alloy is used as the matrix of the friction material, then the layer 18 should either be a copper, copper alloy, iron or other metal which permits sinter-bonding of the two layers. The remarkably tenacious character of the bond also suggests some mechanical interlocking of the two layers which is achieved by shrinkage of the interlocked areas. Other considerations must also be taken into account in determining the proper combination of friction material matrix and bonding medium layer 18, e.g. the two metals should be sinterable at approximately the same temperature; the bonding medium layer must also be extrudible (especially when a perforated backing member is used and the layer 18 is to be forced into the perforation of the backing after sintering per process "C," FIGURE 13). The bonding medium layer 18 must also be strong, compactible and possess sufficient shear strength to prevent the compact from fracturing at the mortised connections with the backing 20.

Specific formulae, and their associated backing layers are indicated in the following chart, along with the associated processing data; all the formulae are processable under "D" or any one of "A," "B," or "C" (see flow sheets set forth in FIGURE 13).

*Intermediate Powder Layer Compositions*

| A | B | C |
|---|---|---|
| 90 Copper<br>10 Tin | 90 Copper<br>10 Nickel | 100 Iron |

From the processing chart and flow sheet it will be seen that various combinations of matrix and bonding medium layer are possible, viz. copper-copper alloy, copper alloy-copper alloy; copper-iron; iron-copper; iron-iron, etc. Each variation of composition and combination of said composition with bonding medium layer will dictate the preferred processing technique.

In determining the size and number of the perforations 28 in backing 20, there is first taken into account the shear resistance requirement of the article. The cross-sectional area of material from layer 18 which is interfitted with perforations 28 determines the resistance offered to the tangential braking forces encountered at surface 26. Once the order of tangential braking forces to be resisted is known, it is a simple matter to calculate, from the known strength of the layer 18, the necessary cross-sectional area mortising with backing 20.

The perforation size is next established by referring to the extrusile nature of the layer 18. It is necessary to fill the perforations 28 by exerting pressure at surface 26. The periphery of the openings resists intrusion of

*Processing Chart*

| Example | Fraction Material Composition | Intermediate Bonding Layer Composition | Manufacturing Process (See Figure 13) | Preform Pressure (tons/in.²) | Compact Pressure (tons/in.²) | Sintering Temperature (° F.) | Coining Pressure (tons/in.²) |
|---|---|---|---|---|---|---|---|
| 1 | A | A | B | 8 | 20 | 1,500 | 50 |
| 2 | A | C | B | 8 | 20 | 1,800 | 50 |
| 3 | B | A | C | | 20 | 1,200 | 50 |
| 4 | B | A | B | 10 | 20 | 1,200 | 50 |
| 5 | C | A | C | | 20 | 1,500 | 50 |
| 6 | D | A | A | | 30 | 1,475 | 50 |
| 7 | D | C | C | | 30 | 1,475 | 50 |
| 8 | E | B | B | 8 | 20 | 1,800 | 50 |
| 9 | F | A | C | | 30 | 1,475 | 50 |
| 10 | G | A | B | 10 | 20 | 1,560 | 50 |
| 11 | G | A | A | | 30 | 1,500 | 50 |
| 12 | H | B | C | 10 | 50 | 1,800 | 50 |
| 13 | H | C | B | | 50 | 1,800 | 50 |
| 14 | I | B | B | 10 | 50 | 1,800 | 50 |
| 15 | I | B | D | 10 | 50 | 1,800 | 50 |
| 16 | J | C | E | 10 | 30 | 1,800 | 50 |
| 17 | K | C | E | | 15 | 1,850 | 50 |
| 18 | L | C | | | 15 | 1,850 | 50 |

*Friction Material Compositions Chart*

| A | B | C | D |
|---|---|---|---|
| 75 Copper<br>20 Mullite<br>5 Silica | 52.5 Copper<br>20 Mullite<br>5 Silica<br>15 Bismuth<br>7.5 Lead | 60 Copper<br>20 Mullite<br>5 Silica<br>15 Bismuth | 69 Copper<br>12 Mullite<br>3.5 Tin<br>5 Bismuth<br>7.5 Graphite<br>3 Lead |

| E | F | G | H |
|---|---|---|---|
| 60 Copper<br>20 Mullite<br>5 Silica<br>5 Molybdenum<br>10 Graphite | 76 Copper<br>5 Mullite<br>4 Tin<br>15 Graphite | 64 Iron<br>5 Mullite<br>11 Bismuth<br>5 Lead<br>15 Graphite | 30 Iron<br>30 Copper<br>20 Mullite<br>5 Silica<br>5 Molybdenum<br>10 Graphite |

| I | J | K | L |
|---|---|---|---|
| 50 Iron<br>30 Mullite<br>5 Silica<br>5 Molybdenum<br>10 Graphite | 60 Iron<br>14 Mullite<br>11 Bismuth<br>15 Graphite | 64 Iron<br>5 Calcine Kyanite<br>11 Bismuth<br>15 Graphite<br>5 Lead | 48 Iron<br>5 Mullite<br>11 Bismuth<br>25 Graphite<br>5 Lead<br>6 Tin | the material therein so it is important to establish an opening size based on the resistance to intrusion of the layer 18 and the total cross-sectional area necessary for shear resistance and the extrusible property of the layer 18.

A third factor relating to the perforations 28 is the distribution thereof. Assuming a single opening at the center of the backing 20, material from layer 18 will fill the opening if pressure at surface 26 can produce enough lateral flow of the material to fill the opening. It is a much simpler matter to divide the cross-sectional area into a greater number of openings and then distribute these openings to reduce the lateral flow requirements necessary to achieve filling the perforation.

A fourth factor in the matter of perforation size is the thickness of the backing member 20. The thicker the backing member, the greater the volume of material from layer 18 must be forced within the perforations to fill the perforations. This necessitates a higher order of pressures at the face 26 and also necessitates a larger opening of the perforation to accommodate the greater volume inflow.

All these factors are taken into account in determining a given construction of the backing member 20 in relation to the layer 18 and the general functional requirements of the friction article. An example of one clutch friction article that has been constructed and proved satisfactory is one in which a 90% copper, 10% tin bonding medium layer is used in combination with a backing member which is 1/32 of an inch thick, and has a total of 35% perforations each 1/4 inch in diameter. The coining pressure in this instance was 100,000 p.s.i.

Figure 7:
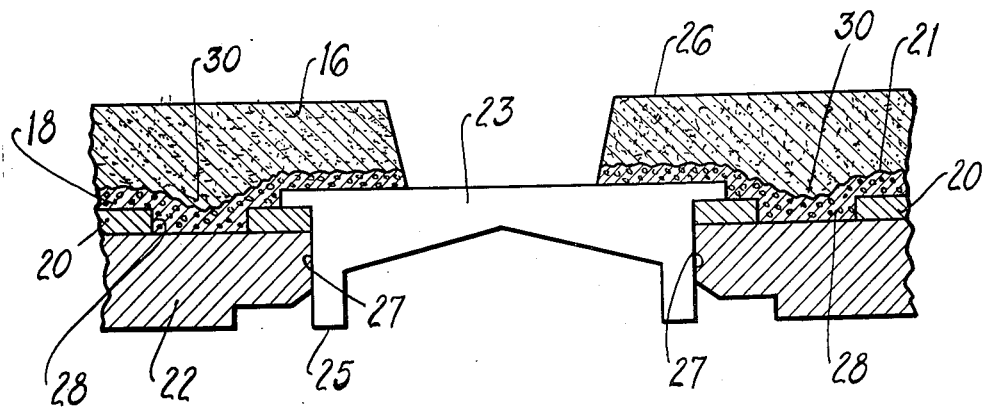
FIGURE 7 is an enlarged detail section view of the fastener also shown in FIGURE 4.

All that remains in completing the mounting is a method for attaching the perforated backing 20 to a carrier member 22. To accomplish this, a fastener 23 (FIGURES 4, 7) is embedded in the layers 16 and 18 and lies against the perforated backing 20. The end 25 of the fastener is passed through an opening 27 in the carrier and riveted thereto.

Figure 6:
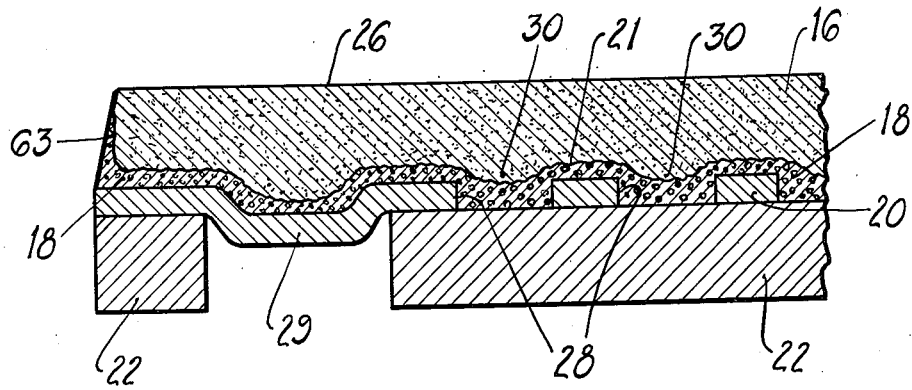
FIGURE 6 is an enlarged fragmentary section view of the locating nib shown in FIGURE 4.

Referring to FIGURES 4 and 6, there are provided two indentations 29 in the backing 20 which are formed by a striking operation. These indentations 29 extend into companion openings in the carrier 22 to prevent rotation of the friction article on the carrier 22. The indentations 29 also resist tangential braking forrces tending to displace the friction article.

It should be further noted that the regions 30 of layers 16 and 18 dip toward the backing member 20 where they overlie the perforations 28 and indentation 29. One of the previously encountered difficulties was the tendency for these indentations 29 to become sheared off by tangential loading. The punching operation used for forming the indentations left a reduced cross-sectional area of material joining the base of backing member 20 and the offset indented portions 29. The resulting weakness of the indentation increased the likelihood of breaking off the indentations. This defect is corrected in the present invention since material from layer 18 is forced downwardly into the indentation, and the tendency of the indentation to shear off is resisted by sintered powder metal material which fills the indentation.

Figure 3:
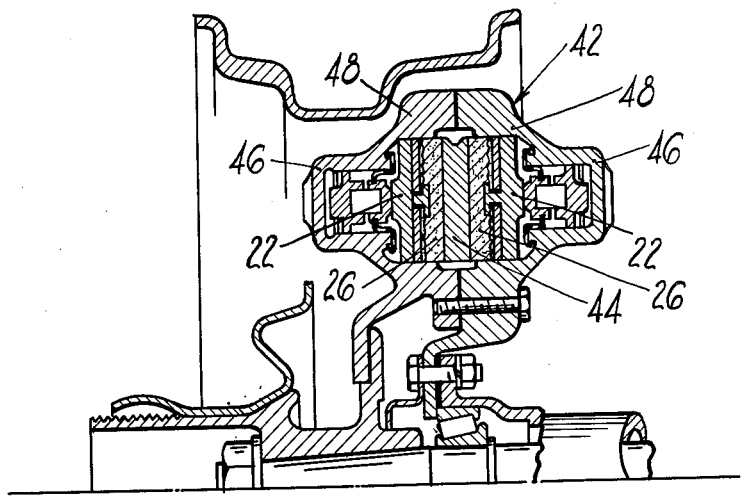
FIGURE 3 is a section view of a "caliper" brake provided with friction articles constructed according to the present invention.

The described method of attachment between layers 16 and 18, between layer 18 and backing 20, and between backing 20 and carrier member 22 has been tried successfully with the "caliper" brake 42 shown in FIGURE 3. This brake was selected for testing the structural strength of the article because the brake presents stringent requirements for mounting friction articles involving a high order of normal pressures and a high order of tangential loading on the friction surface. Details of the caliper brake construction are shown generally in U.S. Patent No. 2,754,936, issued July 17, 1956.

A carrier member 22 (FIGURES 2, 3) is provided on each side of a rotor 44 and is brought into engagement with the rotor by means of fluid motors 46 which are located in the two limbs 48 extending on opposite sides of the rotor, and in close proximity thereto. The ends 49 of carrier 22 are apertured to receive guide members that prevent circumferential movement of the carrier member 22 when friction surface 26 is brought into engagement with the rotor. These guide members prevent turning of the friction unit and constrain it from circumferential movement.

As a result of extensive testing of the friction device made in accordance with the described process, where the product is used on a "caliper" type brake, we have substantiated adequate performance when there is as high as 1,400 pounds per square inch normal pressures against the face of the lining, and tangential braking loads as high as 500 p.s.i.

It is possible during the formation of the friction article to provide a certain curvature at the base of the friction segment so that it will conform to the shape of an arcuate brake shoe. Referring to FIGURE 8, there can be made friction segments which are curved rather than flat members, this slight curvature being sufficient to permit the friction segment to lie flat against the rim 52 of arcuate brake shoe 54. Rivets 55 are then passed through the web 56 and the ends thereof are upset to fix the friction segment circumferentially on the shoe. The lining on the shoe is brought into engagement with the usual brake drum (not shown).

Referring to FIGURE 9, there is provided an annular clutch plate 58 having a number of sector shaped friction segments (indicated by reference numeral 14 in FIGURE 1) which are spaced around the circumference of the annular carrier plate 58.

The rivet type fastening method can be used to hold the sector shaped friction segments onto the clutch plate substantially as described in conjunction with the "caliper" type brake and the shoe type brake.

In each of these methods of attachment it is possible to wear the friction material layer 16 down to the layer 18 without fracturing the bond between layer 16 and 18. One of the advantages which is obtained is that when the layer 16 becomes abraded down to the interface 21 there is exposed portions of layer 18. This metal layer 18, which may consist of copper or copper alloy in the case of a copper matrix friction composition, reduces the coefficient of friction, thus giving an indication that the brake requires servicing. There is not a complete loss of effectiveness since in the areas of the lining overlying openings 28 there are portions 30 of friction material that are embedded in layer 18 and these portions provide sufficient friction surface to prevent complete inoperability of the device or too drastic reduction in the brake or clutch effectiveness.

Having thus described in detail the process of attaching layer 16 to layer 18 and one of the means for attaching layer 18 to backing 20, there will next be described a number of processes of attachment of layer 18 directly to a carrier 22.

Referring to FIGURES 10, 11 and 12, the perforated backing member 20 can be completely eliminated for some applications and a rivet passed through layers 16 and 18 and directly fastened to a carrier which may consist of a rim of an arcuate brake shoe (not shown). Referring to FIGURE 11, a portion 60 of layer 18 can be formed into an integral rivet button and this portion 60 is deformable to provide a rivet fastening of the friction segment to a carrier 22 or supporting member.

Referring to FIGURE 12, a method for welding the friction segment to a support member is illustrated. When a ferrous or copper metal matrix is used for the friction material layer 16, and a ferrous material used in layer 18, then the friction segment is weldable to rim 62 by spot welding. The electrodes 64 and 66 will produce the necessary temperature required for spot welding layer 18 at various points along the length of the friction segment to the rim 62.

These last three processes will indicate a wide variety of techniques for fasteningn the intermediate layer 18 to the carrier member.

The invention thus embodies two principles; namely, securement of a friction material layer to an intermediate sintered powder layer and then attachment of the intermediate powder layer to a mounting member. In all instances the securement of the friction material layer 16 to the intermediate layer 18 is by means of pressing the two layers together while the intermediate layer is in powder metal form, and then sintering them to simultaneously coalesce the friction material particles of both layers and concurrently bond the adjoining interface. This intermediate powder layer 18 is mortisible with a perforated member which in turn is securable to a carrier member; it is also possible to eliminate the perforated member and attach the intermediate layer 18 directly to the support member. We have found it necessary to provide the intermediate layer 18 because the friction material is weak and is difficult to bond. There is a very slight impact resistance to the layer 16, thus the necessity for layer 18.

It becomes increasingly difficult to obtain a bonding of the friction material layer 16 when there are high concentrations of ceramic and/or graphite, but by following the process disclosed it has been possible to sinter-bond friction materials having as high as 35% ceramic content and 10% graphite content. (Also see formulae "B," "E," "I" and "J.")

Figure 5:
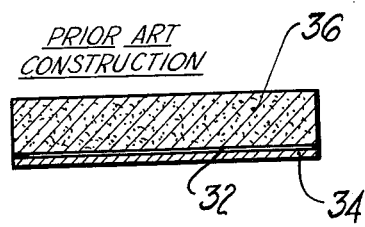
FIGURE 5 is an enlarged section view of a friction article shown as it is typically constructed with prior art techniques.

With the present invention, it is possible to achieve a bonding between layers 16 and 18 when the ceramic (and/or graphite in the case of copper base lining) content prohibits securement by previously known methods. A typical prior art method of attachment (FIGURE 5) is to electrolytically deposit a layer 32 of copper on the surface of backing 34, the thickness of the coating being in the order of 4- to 5-thousandths of an inch. Friction material layer 36 is then provided over layer 32, and then under pressure and heat there is sought a fusion of the friction material with the coating. With this described process it becomes increasingly difficult to achieve the desired degree of fusion when the concentration of ceramic and/or graphite content is increased.

With the present invention the concentration of ceramic and/or graphite does not preclude sinter-bonding. Any concentration of ceramic and/or graphite may be included in the friction material layer with the only limitation being the ability of the friction material to remain cohesive.

Since the layer 18 originates as a powder metal layer, it can be made of any thickness, and because it can be built up to any preferred extent it becomes more versatile as an attachment means.

In some instances, there has been built up a ridge 63 of material from layer 18 which surrounds the friction material layer 16, and lends some lateral support to the friction material layer 16, preventing it from crumbling and breaking away at an excessive rate during use. The friction material layer 16 can still be used in entirety inasmuch as this surrounding lip 63 of material 18 is of very soft material which does not score or otherwise damage the opposing friction surface when the layer 16 has worn down to the level of the lip 63.

While the invention has been described in conjunction with selected example embodiments of the process and product of manufacture, it will be apparent to those skilled in the art that the principles of the invention are capable of wide application. It is intended, therefore, that there will be included within the scope of the following claims such variations and revisions of the invention which incorporate the herein disclosed principles.

We claim:

1. In a process for bonding a first powdered material comprising a mixture of nonmetallic and metallic powders to a backing member, to which it will not strongly sinter bond directly: providing a plurality of closely spaced foramina in a face of said backing member, providing a layer of said first powdered material in its nonsintered condition, placing a loose layer of a substantially completely metallic and strongly sinterable powdered material against a face of said first layer of powdered material, said second layer being sinterable with the metallic powder of said first layer and having a coefficient of expansion generally equal to that of said first layer, compacting said layers together, and sintering said layers together without the application of externally applied pressure, said second layer being forced firmly into the opening of said backing member to lock said structure together.

2. In a process for bonding a first powdered material comprising a mixture of nonmetallic and metallic powders to a backing member to which it will not strongly sinter bond directly: providing a plurality of closely spaced foramina in a face of said backing member, providing a layer of said first powdered material in its nonsintered condition, placing a loose layer of a substantially completely metallic and strongly sinterable powdered material between said first layer of powdered material and said foraminous face of said backing member, said second layer being sinterable with the metallic powder of said first layer and having a coefficient of expansion generally equal to that of said first layer, compacting said layers against said backing member, and sintering the resulting compacted structure without the application of externally applied pressure.

3. In a process for bonding a first powdered material comprising a mixture of nonmetallic and metallic powders to a backing member, to which it will not strongly sinter bond directly: providing a plurality of closely spaced foramina in a face of said backing member, providing a layer of said first powdered material in its nonsintered condition, placing a loose layer of a substantially completely metallic and strongly sinterable powdered material between said first layer of powdered material and said foraminous face of said backing member, said second layer being sinterable with the metallic powder of said first layer and having a coefficient of expansion generally equal to that of said first layer, compacting said layers against said backing member, sintering the resulting compacted structure without the application of externally applied pressure, and coining said second layer firmly into the opening of said backing member to lock said structure together.

References Cited in the file of this patent

UNITED STATES PATENTS

| | | |
|---|---|---|
| 1,910,884 | Comstock | May 23, 1933 |
| 2,141,164 | Brehm | Dec. 27, 1938 |
| 2,178,527 | Wellman | Oct. 31, 1939 |
| 2,251,410 | Koehring et al. | Aug. 5, 1941 |
| 2,277,107 | Imes | Mar. 24, 1942 |
| 2,289,311 | Wellman | July 7, 1942 |
| 2,359,361 | Gleszer et al. | Oct. 3, 1944 |
| 2,381,941 | Wellman et al. | Aug. 14, 1945 |
| 2,462,821 | Wellman | Feb. 22, 1949 |
| 2,509,909 | Davis | May 30, 1950 |
| 2,784,105 | Stedman et al. | Mar. 5, 1957 |
| 2,806,570 | Markus | Sept. 17, 1957 |

FOREIGN PATENTS

| | | |
|---|---|---|
| 769,212 | Great Britain | Mar. 6, 1957 |